UNITED STATES PATENT OFFICE.

ISAAC W. DRUMMOND, OF NEW YORK, N. Y.

COMPOUND OF CELLULOID AND LUMINOUS MATERIAL.

SPECIFICATION forming part of Letters Patent No. 248,413, dated October 18, 1881.

Application filed September 15, 1881. (No specimens.)

*To all whom it may concern:*

Be it known that I, ISAAC WYMAN DRUMMOND, of the city and county of New York, in the State of New York, have invented a certain new and useful Compound of Celluloid and Luminous Material, of which the following is a specification.

It is well known that sulphide of calcium and certain other materials, by being exposed to daylight or a strong artificial light, have excited in them a molecular action which produces phosphorescence, so that they will be rendered luminous in the dark.

My invention consists in a compound of celluloid, which it is known is a very tough and durable substance, and luminous or phosphorescent material, preferably sulphide of calcium. The compound may be produced in a solid form, and various articles made therefrom which will be luminous at night, or the luminous or phosphorescent material may be added to a solution of celluloid and a luminous paint formed, which will be far more durable and impervious to moisture than any paint or varnish.

In making my compound in a solid form I treat the wood fiber or cellulose in the manner usual in making celluloid by soaking it in a mixture of sulphuric and nitric acid and then grinding it, in water, to a fine pulp, after which it is pressed to express the larger part of the moisture. To the pressed pulp, which is still slightly moist, is added finely-comminuted gum-camphor, and I introduce with the camphor any suitable quantity of luminous or phosphorescent material, preferably sulphide of calcium, in the form of powder. The comminuted gum-camphor and the luminous powder are thoroughly mixed and incorporated with the pulp by stirring by hand or mechanically, or in any other suitable manner. The mixture of pulp, camphor, and luminous powder is then subjected to powerful pressure to expel the remaining moisture, after which the pressed mass is placed in a mold and subjected to the action of a powerful hydraulic press, the mold being at the same time heated by a steam-jacket, or otherwise, by which the pulp and camphor are converted into celluloid.

The solid luminous compound may be formed into numberless articles which will be luminous or phosphorescent in the dark.

It is well known that celluloid is readily soluble in a solution of camphor and alcohol, and in preparing my liquid compound I first form a solution of ordinary celluloid in camphor and alcohol and add thereto the luminous material in the form of powder. This forms a paint of great durability, and one which is practically impervious to moisture and luminous at night.

Although I prefer sulphide of calcium, any other known luminous or phosphorescent material may be employed as a substitute therefor.

What I claim as my invention, and desire to secure by Letters Patent, is—

1. The compound composed of celluloid and luminous or phosphorescent material, substantially as and for the purpose herein described.

2. The compound composed of celluloid and sulphide of calcium, substantially as and for the purpose herein described.

ISAAC WYMAN DRUMMOND.

Witnesses:
 FREDK. HAYNES,
 ED. GLATZMAYER.